United States Patent
Paxton

(10) Patent No.: US 6,452,705 B1
(45) Date of Patent: Sep. 17, 2002

(54) HIGH-DENSITY OPTICAL INTERCONNECT WITH AN INCREASED TOLERANCE OF MISALIGNMENT

(75) Inventor: Alan H. Paxton, Albuquerque, NM (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/266,181

(22) Filed: Mar. 10, 1999

(51) Int. Cl.[7] .......................... H04B 10/00; G02B 6/28; H01L 27/15; H01L 31/12; H01L 33/00
(52) U.S. Cl. ...................... 359/159; 385/24; 257/82
(58) Field of Search .................. 257/79–103; 385/24; 359/159, 163

(56) References Cited

U.S. PATENT DOCUMENTS

| | | | | |
|---|---|---|---|---|
| 5,001,609 A | * | 3/1991 | Gardner et al. | 362/32 |
| 5,224,184 A | * | 6/1993 | Boudreau | 385/35 |
| 5,280,184 A | * | 1/1994 | Jokerst et al. | 257/82 |
| 5,977,567 A | * | 11/1999 | Verdiell | 257/99 |

* cited by examiner

Primary Examiner—Leslie Pascal
Assistant Examiner—David C. Payne
(74) Attorney, Agent, or Firm—James M. Skorich; Kenneth E. Callahan

(57) ABSTRACT

A free-space optical interconnect architecture is presented that is tolerant of the lateral misalignment of integrated circuit boards in multi-chip module packages. Each transmitter has a different wavelength and correspondingly sensitive detector. The transmitted beams are spread such that the beams' half angles are slightly greater than the maximum expected misalignment.

1 Claim, 3 Drawing Sheets

HIGH-DENSITY OPTICAL INTERCONNECT WITH AN INCREASED TOLERANCE OF MISALIGNMENT

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

The present invention relates generally to signal interconnections between integrated circuit chips, and more particularly to free-space optical interconnections of integrated circuits in multi-chip modules

2. Description of the Prior Art

Modules incorporating multiple chips require interconnects or communication paths between electronic elements. Optoelectronic interconnects are a solution to the impedance mismatching and bottleneck problems of physical wiring. Optoelectronic interconnects that consist of lasers and photo-receivers, convert electrons to photons and then photons back to electrons to establish the interconnections. Optical beams do not strongly interact with each other and their power and bandwidth requirements do not depend strongly on distance, as do physical wires.

Many architectures of optoelectronic interconnects have been proposed. U.S. Pat. No. 5,546,209 uses wavelength-division-multiplexing to simultaneously communicate from one plane to many planes. Several multiple wavelength VCSELs transmit and each succeeding detecting plane absorbs one wavelength and is transparent to the rest. U.S. Pat. No. 5,513,021 uses holographic optical elements in an interconnect architecture to preserve the alignment of large dimension optical substrates. Each holographic optical element must be individually aligned with a respective photonic device.

Free-space optical interconnects frequently have used light sources and receivers all of which operate at a single wavelength of light. They have typically been configured so that the output beam from a light transmitter is well enough collimated that it only falls on one receiver with sufficient intensity for the signal to be received, as is shown in FIG. 1. If a transmitter and its intended receiver are misaligned by more than the half-width of the laser beam at the plane of the receiver, the data are not received. Furthermore, the half-width of the laser beam can not exceed the separation of the receivers. Therefore, the separation between optical transmitters must be greater than a certain distance, which is determined by the expected misalignment between the transmitter and receiver planes. The density of the interconnects is likewise limited.

SUMMARY OF THE INVENTION

The present invention is a free-space optical interconnect architecture that is tolerant of the lateral misalignment of integrated circuit boards in multi-chip module packages. A plurality of transmitters (lasers), each operating at a different wavelength, transmits to a plurality of receivers (detectors) designed to receive only its intended transmission. The transmitted beams are spread such that the beams' half angles are slightly greater than the maximum expected misalignment. The detectors can be closely spaced.

DESCRIPTION OF THE PREFERRED EMBODIMENT

Figure 1:
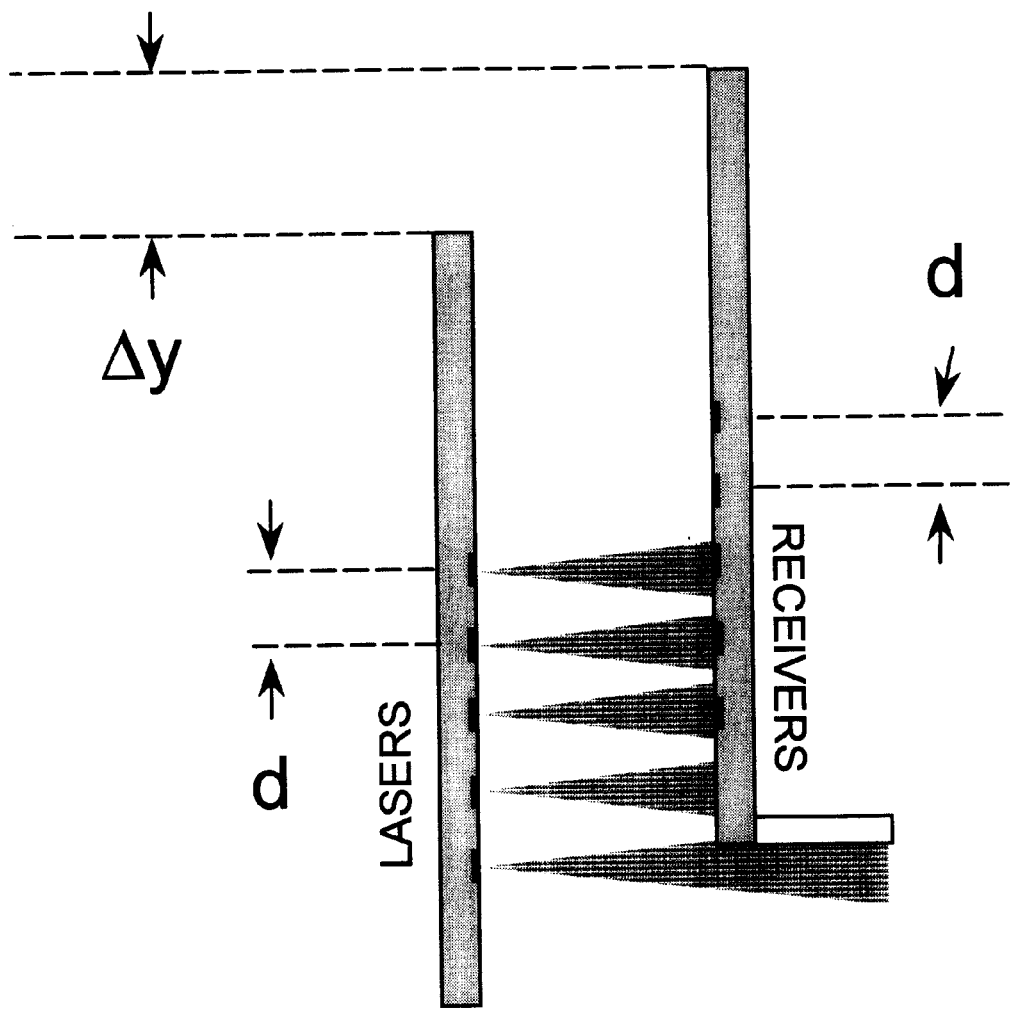
FIG. 1 demonstrates the lateral misalignment tolerance of typical free-space optical interconnects.

FIG. 1 shows a prior art optical interconnect between two planes. The transmitters (lasers) and the detectors (receivers) are spaced a distance d apart. The maximum expected misalignment of the two planes is $\Delta y$. It is apparent in the figure that for misalignments of $\Delta y > d$, the lasers do not illuminate their intended receivers.

Figure 2:
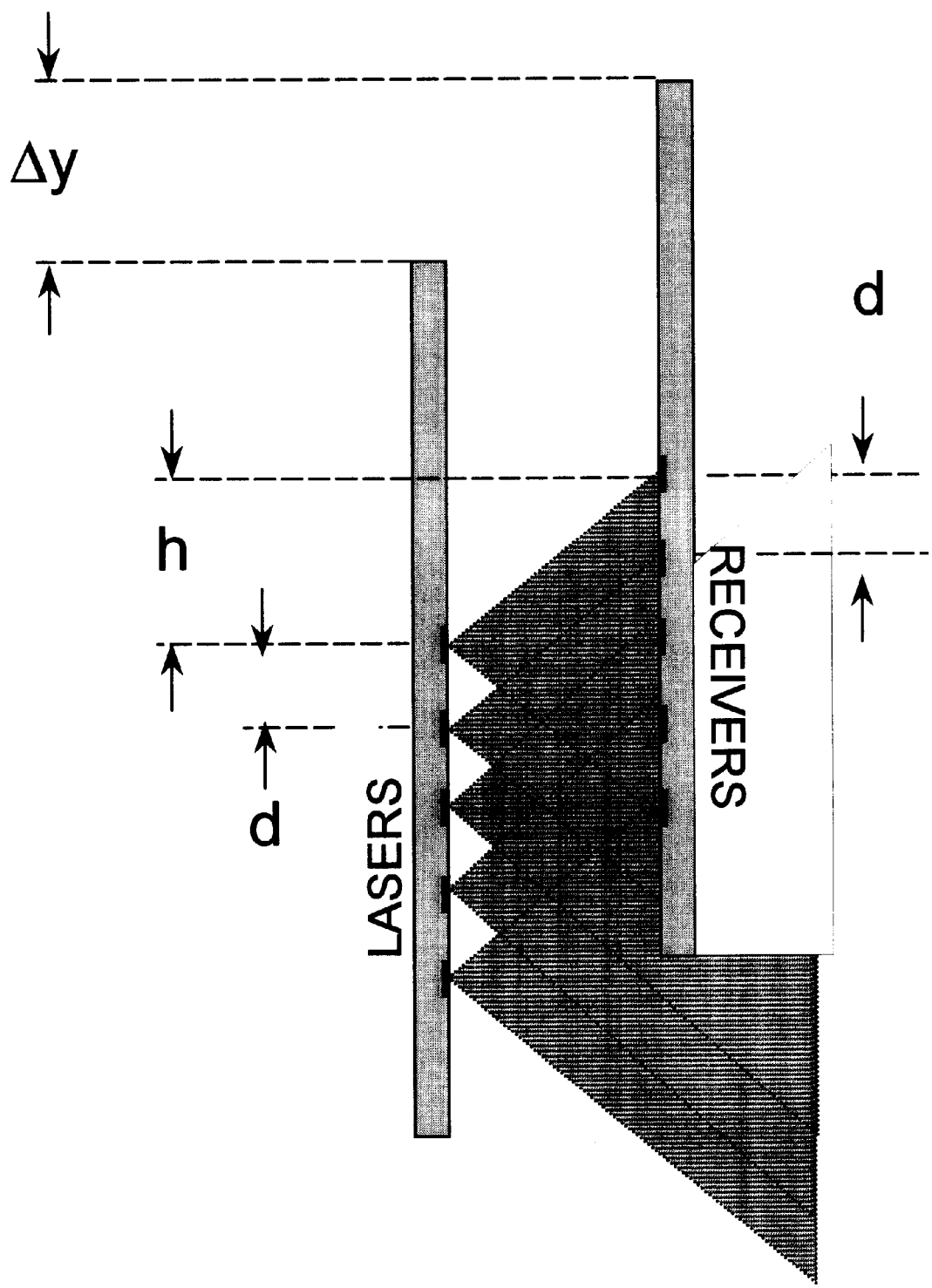
FIG. 2 shows the misalignment tolerance of the present invention.

A planar surface with an array of light sources (lasers) is shown in FIG. 2. A parallel planar surface with an array of receivers is also shown. Light from each laser is emitted at a sufficiently wide angle that it spreads to cover a region of width $2h$, which is slightly larger than $2\Delta y$, at the plane of the receivers. The spreading may occur diffractively due to the limited size of the emitting apertures of the sources. It may also be due to lenses, diffraction gratings, or a scattering medium that causes a suitable angular distribution. The lasers operate at different wavelengths, and each receiver is designed to receive only the wavelength(s) of the source or sources that it is intended to receive. If two lasers are separated by a distance greater than $2h$, they may operate at the same wavelength without inducing crosstalk The advantage of this invention is the ability to use free-space optical interconnects with separations (d in FIG. 2) that are much less than the expected misalignment ($\Delta y$ in FIG. 2) of the devices that are interconnected. For example, consider a simple configuration in which each receiver is intended to receive the signal from only one source, and each source is intended to transmit to only one receiver. If receivers and transmitters are resonant with n different wavelengths, then the interconnect density that can be achieved with this concept is approximately n times as great as can be achieved with single-frequency transmitters and receivers.

Figure 3:
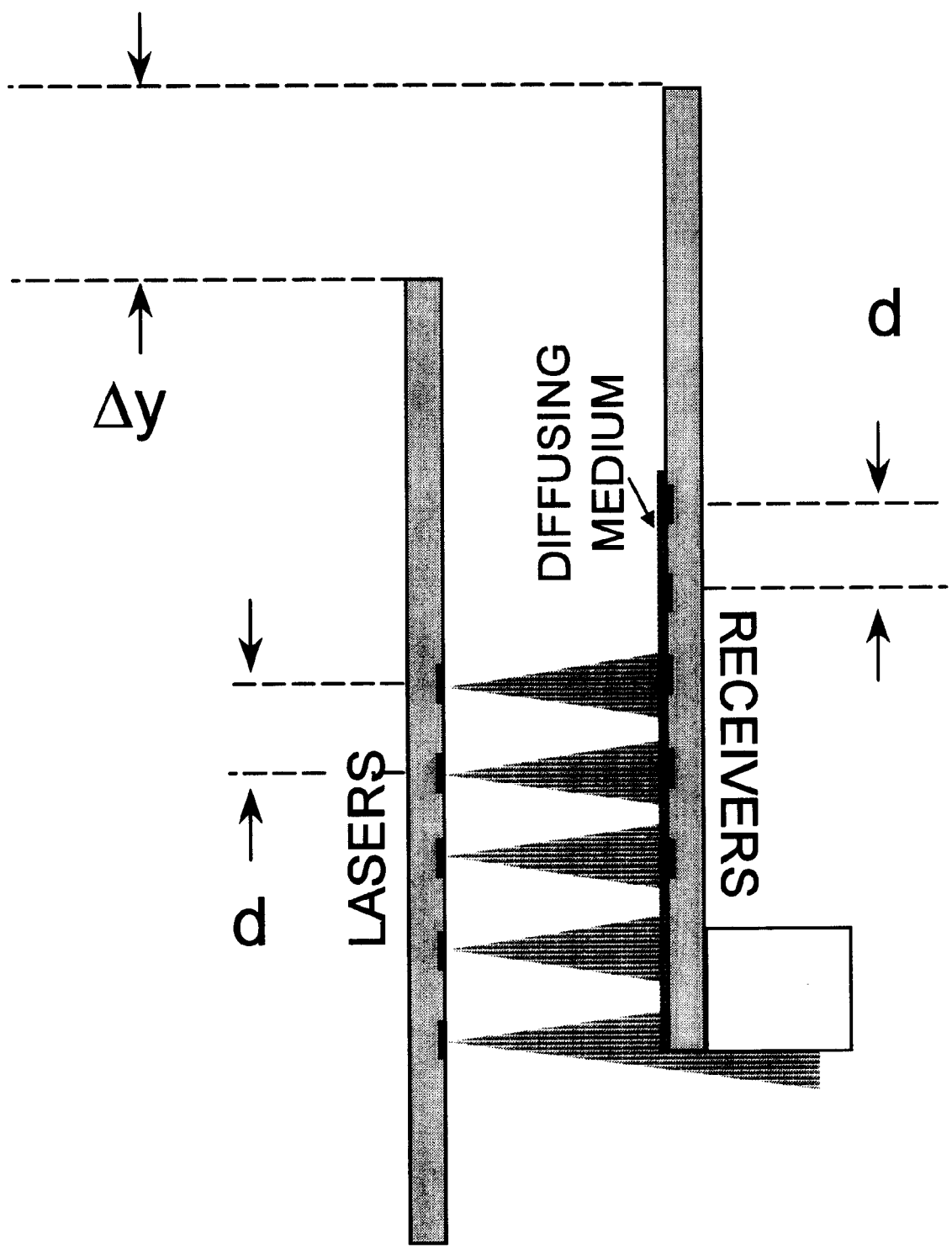
FIG. 3 shows a variation of the present invention in which a diffusing medium or waveguide spreads the light to its intended receiver.

FIG. 3 shows another possible method of spreading the light sufficiently that the anticipated misalignment is allowed for. The light enters a diffusing medium in which it spreads to width $2h$, which is slightly greater than $2\Delta y$. Over this width, the light has sufficient radiance to be received by the intended receiver, which is resonant with its wavelength.

I claim:

1. A misalignment tolerant free-space optical interconnect system for establishing optical communications from a first multi-chip module or a first circuit board to a second multi-chip module or a second circuit board, comprising:

a. a plurality of light sources, each emitting a light beam at a different wavelength;

b. a plurality of light detectors, each sensitive to a particular wavelength corresponding to a particular light source;

c. said light beams being respectively emitted by said light sources at a source plane and being respectively detected by said light detectors at a detection plane, with said source plane and said detection plane being adjacent; and d. a contiguous scattering medium abutting each and every one of said light detectors for spreading each of said light beams to said light detectors, respectively, across said detection plane over a linear distance greater than an expected misalignment between said first and second multi-chip modules or circuit boards.

* * * * *